US006993648B2

(12) United States Patent
Goodman et al.

(10) Patent No.: US 6,993,648 B2
(45) Date of Patent: Jan. 31, 2006

(54) PROVING BIOS TRUST IN A TCPA COMPLIANT SYSTEM

(75) Inventors: Steven Dale Goodman, Raleigh, NC (US); James Patrick Hoff, Raleigh, NC (US); Randall Scott Springfield, Chapel Hill, NC (US); James Peter Ward, Raleigh, NC (US)

(73) Assignee: Lenovo (Singapore) Pte. Ltd., (SG)

( * ) Notice: Subject to any disclaimer, the term of this patent is extended or adjusted under 35 U.S.C. 154(b) by 621 days.

(21) Appl. No.: 09/931,538

(22) Filed: Aug. 16, 2001

(65) Prior Publication Data

US 2003/0037231 A1    Feb. 20, 2003

(51) Int. Cl.
    G06F 9/24   (2006.01)
(52) U.S. Cl. .......................................... 713/2; 713/155
(58) Field of Classification Search ................ 713/1,
        713/2, 187, 193, 200, 100, 176; 711/163,
        711/167; 365/185.04
    See application file for complete search history.

(56) References Cited

U.S. PATENT DOCUMENTS

| 5,522,076 A | 5/1996 | Dewa et al. ................. 395/700 |
| 5,802,592 A | 9/1998 | Chess et al. ................. 711/164 |
| 5,844,986 A | 12/1998 | Davis ............................ 380/4 |
| 5,937,063 A | 8/1999 | Davis ............................ 380/4 |
| 5,987,536 A | 11/1999 | Johnson et al. ................ 710/36 |
| 6,009,524 A | 12/1999 | Olarig et al. ................ 713/200 |
| 6,138,239 A | 10/2000 | Veil ............................ 713/200 |
| 6,188,602 B1 * | 2/2001 | Alexander et al. ..... 365/185.04 |
| 6,263,431 B1 * | 7/2001 | Lovelace et al. ............... 713/2 |
| 6,272,628 B1 * | 8/2001 | Aguilar et al. ................. 713/2 |
| 6,308,265 B1 * | 10/2001 | Miller ............................ 713/2 |
| 6,463,155 B1 * | 10/2002 | Akiyama et al. ........... 380/278 |
| 6,581,159 B1 * | 6/2003 | Nevis et al. ................... 713/2 |
| 6,715,067 B1 * | 3/2004 | Rhoads et al. ................. 713/1 |
| 6,754,895 B1 * | 6/2004 | Bartel et al. ................ 717/171 |

OTHER PUBLICATIONS

"Client Security in the Enterprise Network: Dell's Perspective," *Dell Highlight*, Feb. 2000, pp. 1-6.
"Trusted Computing Platform Alliance (TCPA)," *Main Specification Version 1.0*, Jan. 25, 2001, pp. 1-284.

* cited by examiner

*Primary Examiner*—Thuan Du
(74) *Attorney, Agent, or Firm*—Kelly Kordzik; Carlos Munoz-Bustamante

(57) ABSTRACT

When a flash unlock routine unlocks the flash memory to permit updating of a BIOS image, a message is left in secure non-volatile memory, such as a EEPROM. Upon the next re-boot, the boot block code will detect the special message in the non-volatile memory and perform a signature verification of the next block of code that is to be executed during the POST process. This code block will check the remainder of the BIOS image before POST proceeds.

6 Claims, 3 Drawing Sheets

PROVING BIOS TRUST IN A TCPA COMPLIANT SYSTEM

CROSS-REFERENCE TO RELATED APPLICATIONS

The present application relates to:

U.S. patent application Ser. No. 09/793,239, now U.S. Pat. No. 6,823,464, entitled "Method of Providing Enhanced Security in a Remotely Managed Computer System";

U.S. patent application Ser. No. 09/931,550, still pending, entitled "System Management Interrupt Generation Upon Completion of Cryptographic Operation"; and U.S. patent application Ser. No. 09/931,629, still pending, entitled "Flash Update Using A Trusted Platform Module," which are hereby incorporated by reference herein.

TECHNICAL FIELD

The present invention relates in general to information handling systems, and in particular, to the update of information in an information handling system.

BACKGROUND INFORMATION

The Basic Input/Output System (BIOS) of a computer is the backbone of the operation of that computer. The BIOS is programming that controls the basic hardware operations of the computer, including interaction with floppy disk drives, hard disk drives and the keyboard. Because of ever changing computer technologies, even though a computer may still be acceptable to a user, often the BIOS of that computer will not support all of the new technologies.

A conventional method for upgrading the BIOS code or image of a computer is to physically replace the Read-Only-Memory (ROM) based BIOS, which in networks systems, would entail replacing the ROM-BIOS in each processor node, which is very time consuming and adds to the overall system down-time of the network.

There have been solutions for updating a BIOS image associated with a processor without having to physically replace the ROM-BIOS at each computer in the network. For example, one solution is to provide the computer with a Flash EEPROM for the BIOS, also known as a Flash BIOS. With a Flash BIOS, the BIOS image or a portion of the BIOS image can be updated by a software update. This is often performed by downloading or storing the flash information (new BIOS image and update utilities) onto a media storage device, such as a floppy disk, and using the disk at each computer to update or "flash" the BIOS. However, this is very time consuming, especially with large network systems. Further, some of the computers on the network may not have floppy drives or the proper medium transfer device.

A second method is to send the flash information over the network to each computer in the network. The problem with this method is that the flash information is subject to someone introducing malicious code, such as a virus, thereby causing the BIOS to be flashed with a corrupt image.

Yet another method includes transferring the flash information from the source computer to the receiving computer, with the flash information including the flash code, the flash code instructions and an encrypted digital signature corresponding to the identification of the flash code. The sender is authenticated and then the receiving computer is operably placed in a secure mode. A hash value corresponding to the flash information is calculated, and the digital signature from the flash information is decrypted. The flash code is validated by comparing the digital signature of the flash information to the calculated hash, and if validated, the BIOS is flashed with the new flash code, and the computer re-booted.

As a further protection against tampering, the TCPA (Trusted Computing Platform Alliance) requires the BIOS report on its validity each time the system is booted. The usual method for reporting the validity is to generate a hash and extend this hash into a set of registers within the TPM (specifically register PCR0).

The problem with the foregoing is the computation of the hash can be a lengthy process and may result in an unacceptable boot time. As a result, there is a need in the art for a procedure for ensuring BIOS trust without incurring a time penalty on every boot.

SUMMARY OF THE INVENTION

A flash utility will request a flash unlock from system software (e.g., BIOS). After the system software has verified the authenticity and authorization of the flash utility, it will post a message to BIOS using a secure messaging protocol and unlock the flash memory (excluding the boot block code). The flash update utility will update the BIOS image in the flash memory and relock the flash memory. On a subsequent re-boot, the BIOS boot block code will inspect the message buffer and determine whether a message exists that indicates the flash image has been previously updated. The boot block code will then perform a signature verification on the next block of code to be executed. If the signature verifies correctly, the boot block code will store the computed hash in non-volatile, protected memory and pass control to the next code block (POST). If the signature does not verify, the boot block code will suspend the boot process and indicate a failure via some type of alert message.

An advantage of the present invention is that a time penalty will be incurred to check the flash image only when necessary, (i.e., there is some indication that the BIOS image may have been modified.)

The foregoing has outlined rather broadly the features and technical advantages of the present invention in order that the detailed description of the invention that follows may be better understood. Additional features and advantages of the invention will be described hereinafter which form the subject of the claims of the invention.

DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific update utilities, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

The present invention makes use of common cryptographic algorithms. Such cryptographic algorithms may be key-based, where special knowledge of variable information called a "key" is required to decrypt ciphertext. There are two prevalent types of key-based algorithms: "symmetric" (also called secret key or single key algorithms) and "public key" (also called asymmetric algorithms). The security in these algorithms is centered around the keys—not the details of the algorithm itself. With asymmetric public key algorithms, the key used for encryption is different from the key used for decryption. It is generally very difficult to calculate the decryption key from an encryption key. In a typical operation, the "public key" used for encryption is made public via a readily accessible directory, while the corresponding "private key" used for decryption is known only to the receipt of the ciphertext. In an exemplary public key transaction, a sender retrieves the recipient's public key and uses it to encrypt the message prior to sending it. The recipient then decrypts the message with the corresponding private key.

It is also possible to encrypt a message using a private key and decrypt it using a public key. This is sometimes used in digital signatures to authenticate the source of a message, and is a process utilized within the present invention.

Figure 3:
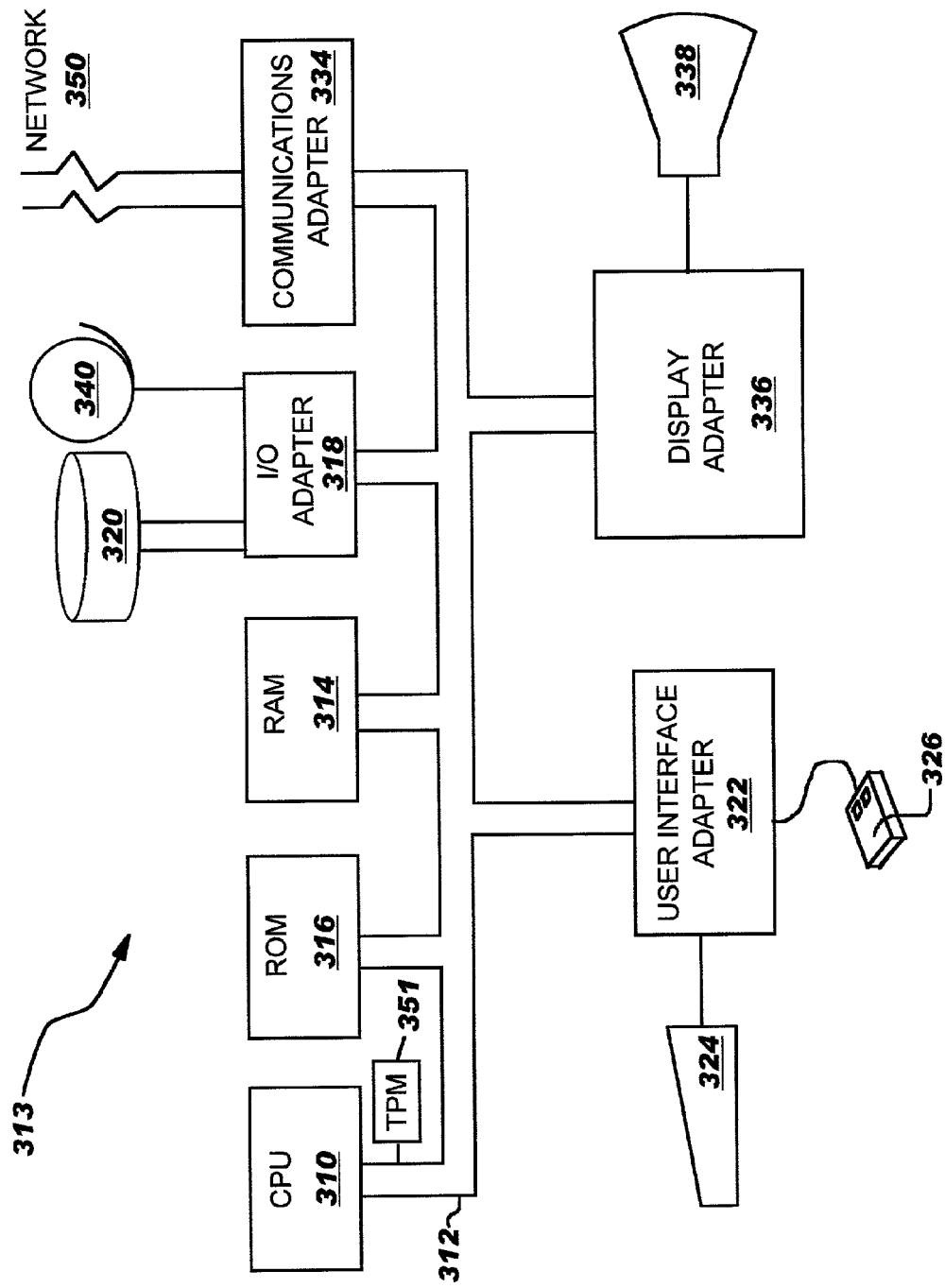
FIG. 3 illustrates an information handling system configured in accordance with the present invention.

Referring to FIG. 3, an example is shown of a data processing system 313 which may be used for the invention. The system has a central processing unit (CPU) 310, which is coupled to various other components by system bus 312. Read only memory ("ROM") 316 is coupled to the system bus 312 and includes a basic input/output system ("BIOS") that controls certain basic functions of the data processing system 313. Random access memory ("RAM") 314, I/O adapter 318, and communications adapter 334 are also coupled to the system bus 312. I/O adapter 318 may be a small computer system interface ("SCSI") adapter that communicates with a disk storage device 320. Communications adapter 334 interconnects bus 312 with an outside network 350 enabling the data processing system to communicate with other such systems. Input/Output devices are also connected to system bus 312 via user interface adapter 322 and display adapter 336. Keyboard 324 and mouse 326 are interconnected to bus 312 via user interface adapter 322. Display monitor 338 is connected to system bus 312 by display adapter 336. In this manner, a user is capable of inputting to the system throughout the keyboard 324 or mouse 326 and receiving output from the system via display 338.

Implementations of the invention include implementations as a computer system programmed to execute the method or methods described herein, and as a computer program product. According to the computer system implementation, sets of instructions for executing the method or methods may be resident in the random access memory 314 of one or more computer systems configured generally as described above. Until required by the computer system, the set of instructions may be stored as a computer program product in another computer memory, for example, in disk drive 320 (which may include a removable memory such as an optical disk or floppy disk for eventual use in the disk drive 320). Further, the computer program product can also be stored at another computer and transmitted when desired to the user's workstation 313 by a network or by external network 350 such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

The present invention is described with respect to the update of a BIOS image within a data processing system, such as system 313. However, the present invention is applicable to the update of any data and/or image within an information handling system.

The present invention makes use of the TCPA (Trusted Computing Platform Alliance) Specification where a trusted platform module (TPM) 351 has been installed within system 313. The TCPA Specification is published at .trustedpc.org/home/home.htm, which is hereby incorporated by reference herein. However, it should be noted that the present invention may also be implemented using other cryptographic verification methods and processes.

System 313, either automatically, or as a result of input from a user, will begin a process where the BIOS image is to be updated. Such a BIOS image may reside within ROM 316 or some other memory module within system 313. The update of the BIOS image may be received over a network 350 or on a diskette.

Figure 2:
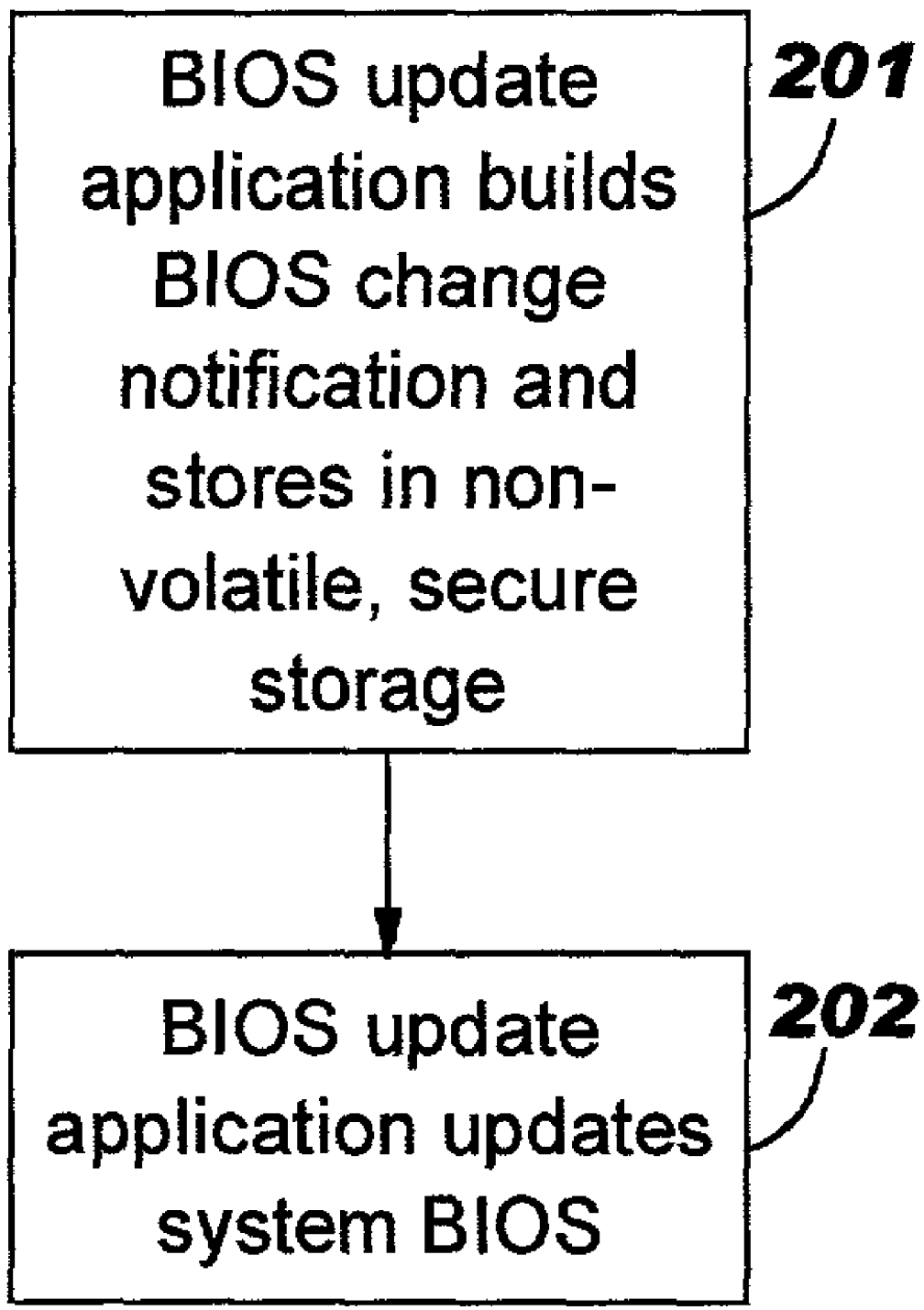

Referring to FIG. 2, the process begins when a flash utility requests flash unlock from the system software (e.g., BIOS). After the system software has verified the authenticity and authorization of the flash utility, in step 201, it will post a message to BIOS using a secure messaging protocol and unlock the flash memory (excluding the boot block code). Posting of the message may be performed using a process as described in cross-referenced patent application Ser. No. 09/793,239 now U.S. Pat. No. 6,823,464. In step 202, the flash update utility will update the BIOS image in the flash memory and relock the flash (either directly or via a call to the BIOS).

Figure 1:
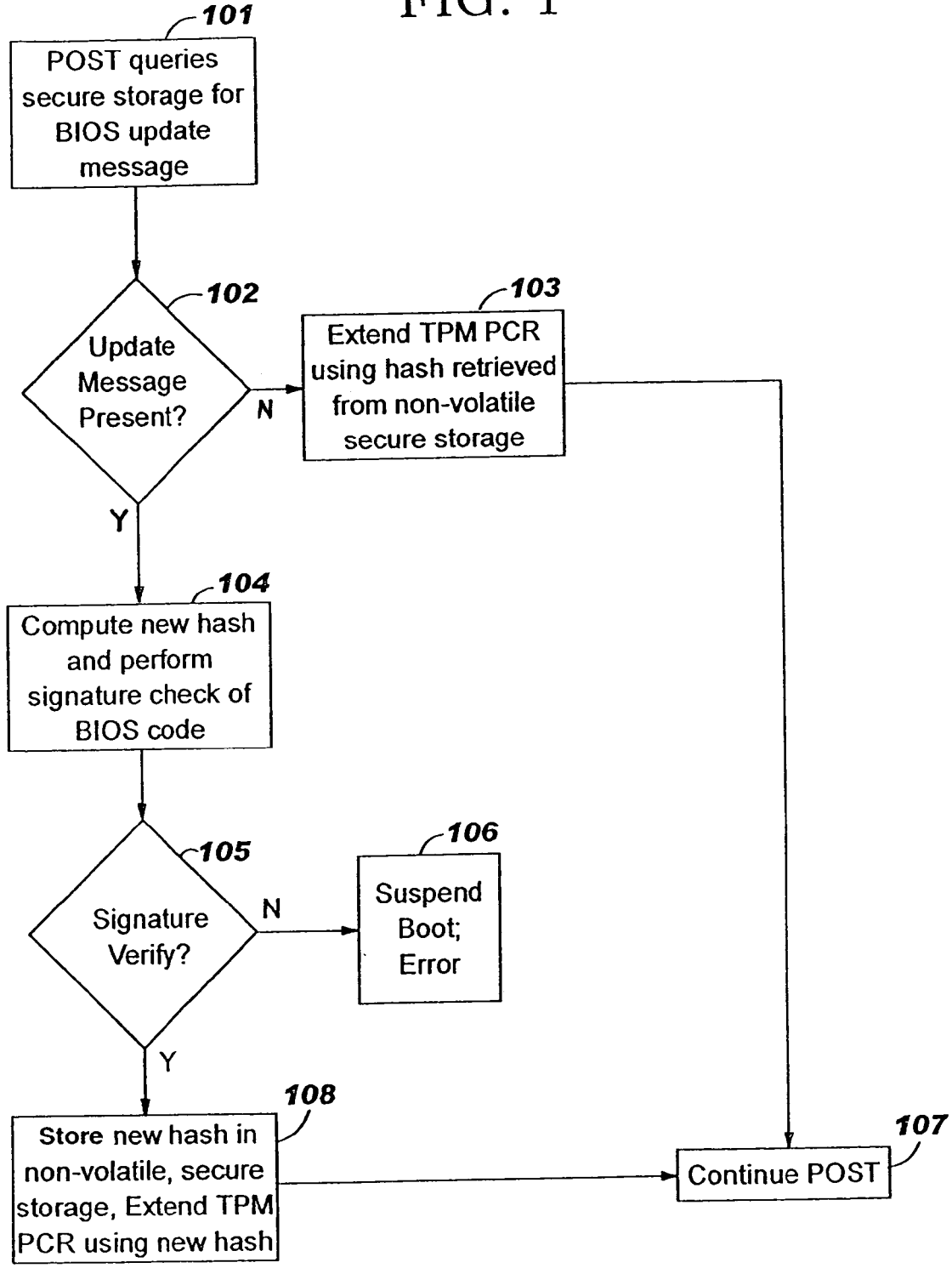
FIGS. 1–2 illustrate flow diagrams configured in accordance with the present invention.

Referring to FIG. 1, on a subsequent re-boot (either warm or cold), the BIOS boot block code in POST will inspect the message buffer noted above to determine if the message indicates that the BIOS flash images has been previously updated. If in step 102, the update message is present, then in step 104, the boot block code will then perform a signature verification on the next block of code to be executed. In step 105, if the signature verifies correctly, then the boot block code will store the new hash in non-volatile, secure storage (step 108), extend the appropriate PCR (register) with the new hash, and pass control to the next code block in POST in step 107. If the signature does not verify, then in step 106, the boot block code will suspend the boot process and indicate the failure via some alert mechanism.

In step 102, if an update message is not present, then in step 103, POST will retrieve and extend the appropriate TPM PCR using the hash that was stored at step 108. Next, the process will continue with POST in step 107.

As is apparent from the description of this process, the flash EEPROM and the system utilities that provide access to the flash EEPROM must be protected from tamper. Numerous methods may be used to accomplish the needed protection. For instance, hardware circuits that provide notification to a secure system function may be incorporated in the system design to prevent unauthorized access to the flash EEPROM. One such implementation is described in U.S. patent application Ser. No. 09/953,775, now U.S. Pat. No. 6,711,690, which is incorporated by reference. Additional hardware may be required to provide protection to the system function that performs the signature verification of the new BIOS image and related utilities.

Although the present invention and its advantages have been described in detail, it should be understood that various changes, substitutions and alterations can be made herein without departing from the spirit and scope of the invention as defined by the appended claims.

What is claimed is:

1. A method for re-booting an operating system software in a data processing system, comprising the steps of:
   determining whether a buffer contains a message indicating that a BIOS image for the data processing system was previously updated;
   performing a signature verification on a remainder of the BIOS image;
   proceeding with re-boot of the operating system software if the signature verification correctly verifies the remainder of the BIOS image;
   not proceeding with the re-boot of the operating system software if the signature verification does not correctly verify the remainder of the BIOS image;
   performing an update to the BIOS image previous to the determining step; and
   storing the message into the buffer responsive to the step of performing the update to the BIOS image.

2. A data processing system comprising:
   means for performing an update to the BIOS image;
   means for storing a message into a memory location wherein the message indicates that the BIOS image has been updated;
   during a subsequent re-boot of the data processing system, means for determining an existence of the message;
   responsive to a determination that the message is stored in the memory location, means for performing a signature verification on a remainder of the BIOS image; and
   means for proceeding with the re-boot of the data processing system if the signature verification correctly verifies the remainder of the BIOS image.

3. The system as recited in claim 2, further comprising:
   means for not proceeding with the re-boot of the data processing system if the signature verification does not correctly verify the remainder of the BIOS image.

4. A computer program product stored on a computer readable medium and operable for re-booting an operating system software in a data processing system, comprising the program steps of:
   determining whether a buffer in the data processing system contains a message indicating that a BIOS image for the data processing system was previously updated;
   responsive to a determination that the buffer contains the message indicating that the BIOS image for the data processing system was previously updated, performing a signature verification on a remainder of the BIOS image;
   proceeding with re-boot of the operating system software if the signature verification correctly verifies the remainder of the BIOS image;
   not proceeding with the re-boot of the operating system software if the signature verification does not correctly verify the remainder of the BIOS image;
   performing an update to the BIOS image previous to the determining step; and
   storing the message into the buffer responsive to the step of performing the update to the BIOS image.

5. A method for re-booting an operating system software in a data processing system, comprising the steps of:
   determining whether a buffer contains a message indicating that a BIOS image for the data processing system was previously updated;
   performing a signature verification on a remainder of the BIOS image;
   proceeding with re-boot of the operating system software if the signature verification correctly verifies the remainder of the BIOS image;
   performing an update to the BIOS image previous to the determining step; and
   storing the message into the buffer responsive to the step of performing the update to the BIOS image.

6. A computer program product stored on a computer readable medium and operable for re-booting an operating system software in a data processing system, comprising the program steps of:
   determining whether a buffer in the data processing system contains a message indicating that a BIOS image for the data processing system was previously updated;
   responsive to a determination that the buffer contains the message indicating that the BIOS image for the data processing system was previously updated, performing a signature verification on a remainder of the BIOS image;
   proceeding with re-boot of the operating system software if the signature verification correctly verifies the remainder of the BIOS image;
   performing an update to the BIOS image previous to the determining step; and
   storing the message into the buffer responsive to the step of performing the update to the BIOS image.

* * * * *